US011265267B2

(12) United States Patent
Kaku et al.

(10) Patent No.: US 11,265,267 B2
(45) Date of Patent: Mar. 1, 2022

(54) RELAY APPARATUS

(71) Applicant: DENSO CORPORATION, Kariya (JP)

(72) Inventors: Yoshifumi Kaku, Kariya (JP); Shinya Ishibashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 21 days.

(21) Appl. No.: 16/669,947

(22) Filed: Oct. 31, 2019

(65) Prior Publication Data

US 2020/0177523 A1 Jun. 4, 2020

(30) Foreign Application Priority Data

Nov. 30, 2018 (JP) .............................. JP2018-225693

(51) Int. Cl.
*H04L 12/937* (2013.01)
*H04L 49/253* (2022.01)
*H04L 47/32* (2022.01)
*H04L 49/55* (2022.01)

(52) U.S. Cl.
CPC ............ *H04L 49/253* (2013.01); *H04L 47/32* (2013.01); *H04L 49/555* (2013.01)

(58) Field of Classification Search
None
See application file for complete search history.

(56) References Cited

U.S. PATENT DOCUMENTS

| 6,081,512 A * | 6/2000 | Muller .................. H04L 45/245 370/256 |
| 2013/0077622 A1* | 3/2013 | Tatsumi .............. H04L 12/2867 370/386 |
| 2015/0256458 A1 | 9/2015 | Shiraki |

FOREIGN PATENT DOCUMENTS

| JP | 2017-200012 A | 11/2017 |
| JP | 2018-160815 A | 10/2018 |

* cited by examiner

*Primary Examiner* — Kouroush Mohebbi
(74) *Attorney, Agent, or Firm* — Posz Law Group, PLC

(57) ABSTRACT

A relay apparatus includes: ports for transmitting and receiving communication data; a relay process portion that executes a relay process of transmitting the communication data received from at least one of the ports, from a destination port corresponding to the at least one of the ports connected to a destination device in accordance with a destination for the communication data; and a setting portion that, by an instruction from at least one external device, sets each of the ports to either a relay prohibition state in which relay of the communication data is prohibited or a relay allowance state in which the relay of the communication data is allowed. When the destination port, the relay process portion discards the received communication data without saving the received communication data.

11 Claims, 4 Drawing Sheets

FIG. 6

| PORT | STATE |
|---|---|
| 1 | RELAY ALLOWANCE |
| 2 | RELAY PROHIBITION (SHUTDOWN) |
| 3 | RELAY ALLOWANCE |

RELAY APPARATUS

CROSS REFERENCE TO RELATED APPLICATION

The present application claims the benefit of priority from Japanese Patent Application No. 2018-225693 filed on Nov. 30, 2018. The entire disclosure of the above application is incorporated herein by reference.

TECHNICAL FIELD

The present disclosure relates to a relay apparatus.

BACKGROUND

For example, a switch apparatus as a relay apparatus includes multiple ports and relays a frame from one port to a different port.

SUMMARY

One example embodiment of the present disclosure provides a relay apparatus capable of preventing inappropriate communication data from being transferred.

According to one example embodiment, a relay apparatus includes multiple ports for transmission and reception of communication data, a relay process portion, and a setting portion.

The relay process portion executes a relay process of transmitting the received communication data. The setting portion sets each of the multiple ports to either a relay prohibition state in which relay of the communication data is prohibited or a relay allowance state in which the relay of the communication data is allowed.

BRIEF DESCRIPTION OF DRAWINGS

The above and other objects, features and advantages of the present disclosure will become more apparent from the following detailed description made 10 with reference to the accompanying drawings. In the drawings:

FIG. 6 is an explanatory diagram for explaining an operation example.

DETAILED DESCRIPTION

Figure 1:
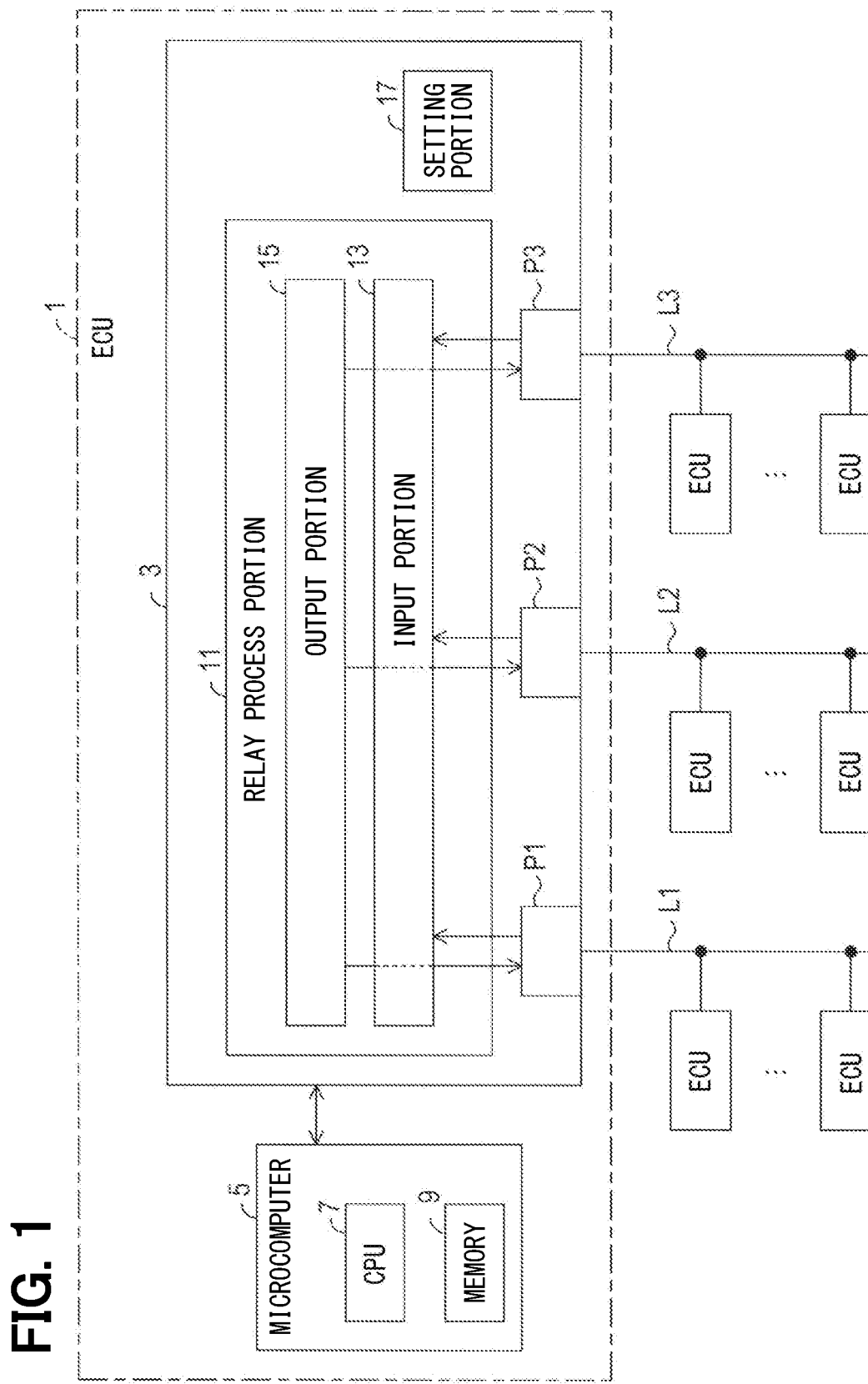
FIG. 1 is a block diagram showing configurations of an electronic control unit and a switch according to an embodiment.

For example, as a relay apparatus (that is, a switch) in Ethernet, there is an relay apparatus capable of alternatively setting a state of a port to a relay prohibition state and a relay allowance state. "Ethernet" is a registered trademark. The relay prohibition state may be also referred to as a shutdown state. For the port in the relay prohibition state, at least, transfer and output of communication data from the port is prohibited. By contrast, the relay allowance state corresponds to a state where the relay of the communication data (that is, transmission-reception) is allowed, in other words, a state where the state of the port is not set to the relay prohibition state.

As a result of detailed examination by the inventors, the following difficulties were found.

As a configuration of the relay apparatus, a configuration in which "when a destination port of the received communication data is in the relay prohibition state, the received frame is stored in a buffer, and thereafter when the destination port is set to be in the relay allowance state, transmission-output of the stored communication data is started" may be considered. The destination port may correspond to a port connected to a destination device. In Ethernet, the frame transmitted and output between the devices corresponds to the communication data described above.

However, in the configuration described above, the communication data transferred after being stored in the buffer described above corresponds to the communication data generated when the destination port is in the relay prohibition state. It may be highly possible that the transferred communication data corresponds to communication data unexpected for the destination device.

This is because it may be considered that each of the ports of the relay apparatus is set from the relay prohibition state to the relay allowance state after the device connected to the port becomes in a state of normally executing a process (hereinafter, a communication relation process) in which the communication data is utilized. Therefore, the communication data generated when the destination port is in the relay prohibition state corresponds to communication data before preparation for normally executing the communication relation process is completed in the destination device. It may be assumed that the generated communication data corresponds to the unexpected communication data for the destination device, in other words, inappropriate communication data.

Accordingly, in the described above configuration, the unexpected communication data may be delivered to the destination device, and as a result, an unexpected operation as an operation of the destination device may be caused.

One example embodiment of the present disclosure provides a relay apparatus capable of preventing inappropriate communication data from being transferred.

According to one example embodiment, a relay apparatus includes multiple ports for transmitting and receiving communication data, a relay process portion, and a setting portion.

The relay process portion executes a relay process of transmitting the communication data received from at least one of the multiple ports, from a destination port corresponding to the at least one of the multiple ports connected to a destination device in accordance with a destination for the communication data. By an instruction from at least one external device, the setting portion sets each of the multiple ports to either a relay prohibition state in which relay of the communication data is prohibited or a relay allowance state in which the relay of the communication data is allowed.

Furthermore, when the destination port for the communication data received from the at least one of the multiple ports is set to the relay prohibition state, the relay process portion discards the received communication data without saving the received communication data.

According to the configuration, the communication data received when the destination port is in the relay prohibition state is not transmitted from the destination port. Therefore, it may be possible to prevent the inappropriate communication data from being transferred to the destination device.

Furthermore, when receiving the communication data from the at least one of the multiple ports set to be in the relay prohibition state, the relay process portion may discard the received communication data without relaying the received communication data. According to the configuration, it may be possible to improve the effect of preventing the inappropriate communication data from being transferred.

Hereinafter, an embodiment of the present disclosure will be described with reference to the drawings.

[1. Configuration]

An electronic control unit (hereinafter, an ECU) 1 in an embodiment shown in FIG. 1 is mounted on, for example, a vehicle. The ECU 1 includes a switch 3 as a relay apparatus relaying communication between the other devices mounted on the vehicle, a microcomputer 5 executing a process for controlling an operation of the ECU 1 and a process regarding a setting of the switch 3.

The microcomputer 5 includes a CPU 7, a semiconductor memory (hereinafter, a memory) 9 such as, for example, a RAM or a ROM. Each function of the microcomputer 5 may be implemented by the CPU 7 executing a program stored in a non-transitory tangible storage medium. In this example, the memory 9 corresponds to the non-transitory tangible storage medium storing the program. By executing this program, a method in accordance with the program is performed. In addition, a part or all of the function of the microcomputer 5 may be implemented by utilizing one or more hardware. For example, when the described above function is implemented by an electronic circuit which is hardware, the electronic circuit may be implemented by a digital circuit, an analog circuit, or a combination thereof.

The switch 3 is configured as a switch of Ethernet, for example. Therefore, the switch 3 relays the communication data based on a standard of Ethernet. Hereinafter, the communication data to be relayed may be also referred to as a frame.

The switch 3 includes multiple ports P1 to P3 for transmitting and receiving the frame. In the embodiment, the switch 3 includes the three ports P1 to P3. However, the number of ports may be two, four, or more. Each of the ports P1 to P3 of the switch 3 is respectively connected to communication lines L1 to L3. Although the reference number is omitted to be applied, each of the communication lines L1 to L3 is connected to, as the other device, one or more ECUs. Each of the communication lines L1 to L3 may be connected to the other one or more ECUs via the other one or more switches.

Further, the switch 3 includes a relay process portion 11 and a setting portion 17.

The relay process portion 11 includes an input portion 13 for receiving (that is, importing) the frame input to the ports P1 to P3 and an output portion 15 for outputting and transmitting the frame as a transference target to any of the ports P1 to P3.

The relay process portion 11 at least executes a relay process of transmitting the frame (hereinafter, a reception frame) received from any of the ports P1 to P3, from a port (hereinafter, a destination port) connected to a destination device in accordance with the reception frame among the ports P1 to P3.

For example, the relay process portion 11 includes a routing table (for example, a MAC address table) in which an address of the device (that is, the ECU) connected to the end of each of the ports P1 to P3 is recorded. The relay process portion 11 identifies the destination port based on the destination address in the reception frame and the described above routing table, and transmits the reception frame from the identified destination port. The destination address corresponds to an address of the destination device. The MAC address may be employed as the destination address.

The setting portion 17 executes a process of setting each of the ports P1 to P3 to either a relay prohibition state or a relay allowance state. The relay prohibition state corresponds to a state where the relay of the frame is prohibited, and may be also referred to as a shutdown state. As described above, for the port in the relay prohibition state, at least, the transfer and the output of the frame from the port are prohibited. By contrast, the relay allowance state corresponds to a normal state where the relay of the frame is allowed, in other words, a state where the state of the port is not set to the relay prohibition state.

Process contents executed by the setting portion 17 will be described with reference to FIGS. 2 to 4 later.

[2. Process]

[2-1. First Setting Process Executed by Setting Portion]

A first setting process executed by the setting portion 17 of the switch 3 will be described with reference to a flowchart of FIG. 2.

For example, when the ECU 1 is turned on, the microcomputer 5 and the switch 3 are activated. The activations of the microcomputer 5 and the switch 3 correspond to an activation of the ECU 1.

Figure 2:
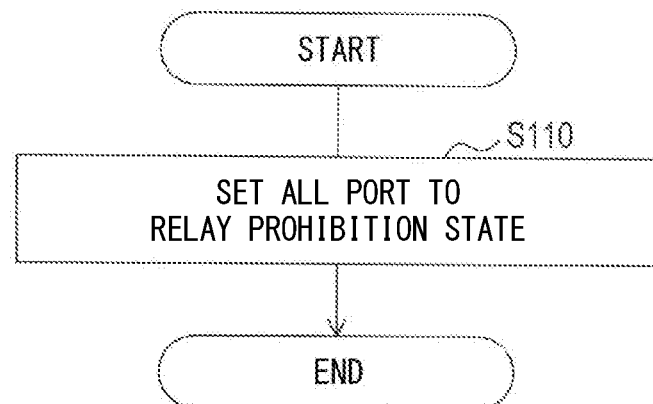
FIG. 2 is a flowchart of a first setting process executed by a setting portion of the switch.

When the switch 3 is activated, the setting portion 17 starts the first setting process in FIG. 2. In S110, the setting portion 17 sets all of the ports P1 to P3 to the relay prohibition state as an initial state. Thereafter, the setting portion 17 ends the first setting process.

[2-2. Second Setting Process Executed by Setting Portion]

A second setting process executed by the setting portion 17 of the switch 3 will be described with reference to a flowchart of FIG. 3.

The microcomputer 5 corresponding to an external device provides, at least, a state setting instruction for each of the ports P1 to P3 to the switch 3. The state setting instruction indicates a target port and indicates either shutdown or port normalization for the port (hereinafter, an indication port) indicated by the state setting instruction. The shutdown means to cause the indication port to be in the relay prohibition state (that is, the shutdown state). The port normalization means to cause the indication port to be in the relay allowance state. The state setting instruction from the microcomputer 5 is provided to the setting portion 17 in the switch 3.

Figure 3:
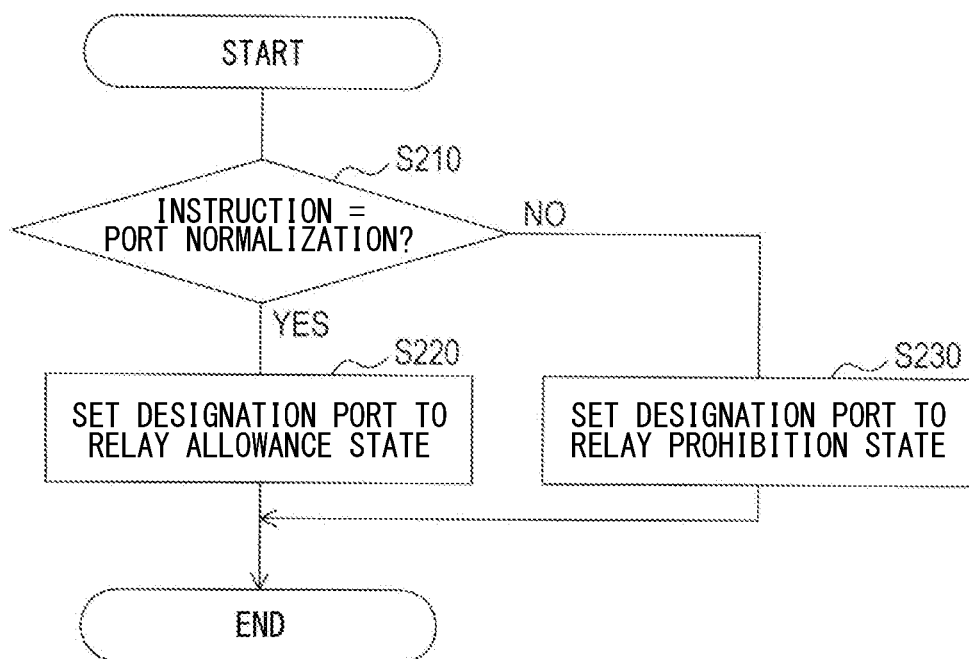
FIG. 3 is a flowchart of a second setting process executed by the setting portion of the switch.

When receiving the state setting instruction from the microcomputer 5, the setting portion 17 starts the second setting process in FIG. 3.

As shown in FIG. 3, when starting the second setting process, the setting portion 17 determines whether the state setting instruction from the microcomputer 5 corresponds to an instruction that indicating the port normalization in S210. When determining that the state setting instruction from the microcomputer 5 corresponds to the instruction that indicates the port normalization, the setting portion 17 sets the port (that is, the indication port) indicated by the state setting instruction to the relay allowance state in S220, and thereafter ends the second setting process.

When the setting portion 17 determines that the state setting instruction from the microcomputer 5 does not correspond to the instruction that indicates the port normalization in S210 described above, that is, when the state setting instruction indicates the shutdown, the process shifts to S230. The setting portion 17 sets the indication port to the relay prohibition state in S230, and thereafter ends the second setting process.

That is, in accordance with the instruction from the microcomputer 5, the setting portion 17 sets each of the ports P1 to P3 to either the relay prohibition state or the relay allowance state.

When being activated, the microcomputer 5 determines whether execution preparation for the communication is completed for each of the communication lines L1 to L3. Specifically, for each of the communication lines L1 to L3, the microcomputer 5 determines whether all the ECUs connected to the communication lines are in a state where a process regarding the communication, for example, a process in which the data in the frame is utilized is normally executable. For example, when being activated, the microcomputer 5 may determines whether a preset waiting time has elapsed for each of the communication lines L1 to L3, and thereby may determine whether the execution preparation of the communication is completed. When there is a communication line determined to be completed for the communication execution preparation, the microcomputer 5 outputs to the switch 3, the state setting instruction indicating the port normalization as the state setting instruction for the port in accordance with the communication line.

Accordingly, the ports P1 to P3 of the switch 3 are changed from the relay prohibition state as the initial state to the relay allowance state as the normal state, in order from the port in accordance with the communication line determined to be completed for the communication execution preparation.

[2-3. Third Setting Process executed by Setting Portion]

A third setting process executed by the setting portion 17 of the switch 3 will be described with reference to a flowchart of FIG. 4.

Figure 4:
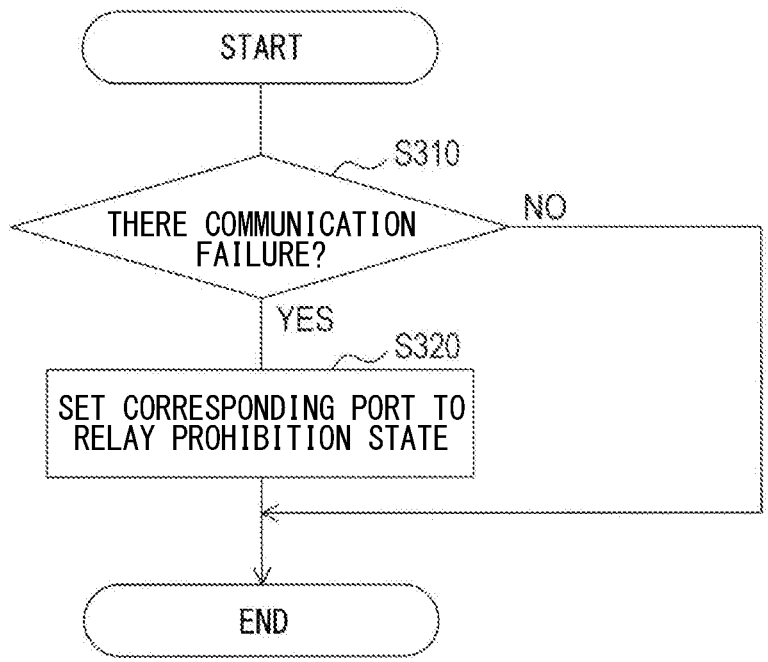
FIG. 4 is a flowchart of a third setting process executed by the setting portion of the switch.

After setting all the ports P1 to P3 to the relay allowance state by the second setting process in FIG. 3, the setting portion 17 executes the third setting process in FIG. 4 for each predetermined time, for example.

As show in FIG. 4, when starting the third setting process, the setting portion 17 determines whether an uncommunicable failure (hereinafter, a communication failure) occurs for each of the ports P1 to P3 in S310.

As the determination in S310, for example, the setting portion 17 may determine whether an error regarding the reception frame continuously occurs a predetermined number of times. That is, when the error regarding the reception frame continuously occurs a predetermined number of times, the setting portion 17 may determine that the communication failure occurs. The error regarding the reception frame may be that the reception frame is abnormal and may be, for example, that the error is detected in error detection for the reception frame, or that a size or a configuration content of the reception frame is out of a standard. As the determination in S310, for example, the setting portion 17 may determine whether the number of error occurrences described above is equal to or more than a predetermined value, may determine whether the ratio of the number of error occurrences described above to the number of normal receptions is equal to or more than a predetermined value, or the like. For example, when the port itself is broken, the communication line connected to the port is broken, or the device (that is, the ECU) connected to the communication line is broken, the setting portion 17 may determine that the communication failure occurs. The number of error occurrences may be also referred to as a numeral number of times when an error occurs.

When the setting portion 17 determines that the communication failure occurs for any of the ports P1 to P3 in S310 described above, the process shifts to S320. The setting portion 17 sets the port determined to have the communication failure to the relay prohibition state. Thereafter, the setting portion 17 ends the third setting process.

When determining that the communication failure does not occur for all the ports P1 to P3 in S310 described above, the setting portion 17 end the third setting process.

That is, the setting portion 17 dynamically sets the port determined to have the communication failure among the ports P1 to P3 to the relay prohibition state. The communication failure includes, for example, an abnormality of the port itself, an abnormality of the communication line connected to the port, and an abnormality of the device (that is, the ECU) connected to the communication line.

[2-4. Process Executed by Relay Process Portion]

Processes executed by the relay process portion 11 of the switch 3 will be described with reference to a flowchart in FIG. 5.

Figure 5:
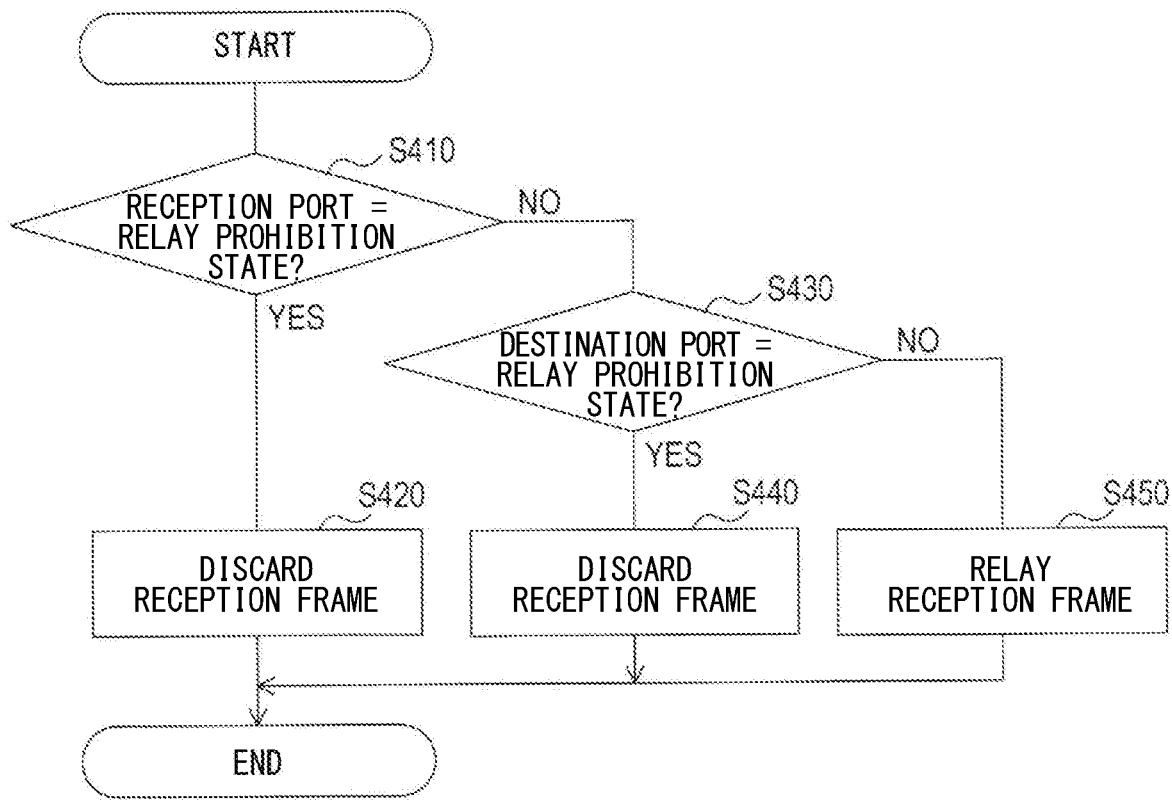
FIG. 5 is a flowchart of a process executed by a relay process portion of the switch.

When receiving the frame from any of the ports P1 to P3, the relay process portion 11 executes a process shown in FIG. 5.

As show in FIG. 5, when receiving the frame, the relay process portion 11 determines whether the port (hereinafter, a reception port) receiving the frame is set to the relay prohibition state in S410. When determining that the reception port is set to the relay prohibition state, the relay process portion 11 discards the reception frame without relaying the reception frame in S420, and thereafter ends the process in FIG. 5.

That is, when receiving the frame from the port set to the relay prohibition state, the relay process portion 11 immediately discards the reception frame without relaying the reception frame. Here, the discard may mean to delete the reception frame without saving the reception frame.

When the relay process portion 11 determines that the reception port is not set to the relay prohibition state in S410 described above, that is, when the reception port is set to the relay allowance state, the process shifts to S430.

In S430, the relay process portion 11 identifies the destination port for the reception frame by the described above procedure, and determines whether the identified destination port is set to the relay prohibition state. When determining that the destination port is set to the relay prohibition state, the relay process portion 11 discards the reception frame in S440 similarly to S420 described above, and thereafter ends the process in FIG. 5.

When the destination port of the reception frame is set to the relay prohibition state, the relay process portion 11 immediately discards the reception frame without saving the reception frame in the switch 3.

When the relay process portion 11 determines that the destination port is not set to the relay prohibition state in S430 described above, that is, when the reception port and the destination port are set to the relay allowance state, the process shifts to S450. In S450, the relay process portion 11 executes the described above relay process on the reception frame. That is, the relay process portion 11 transmits the reception frame from the destination port. Thereafter, the relay process portion 11 ends the process in FIG. 5.

[3. Operation Example]

For example, in the switch 3, as shown in FIG. 6, it is assumed that the port P2 is set to the relay prohibition state, and the ports P1 and P3 are set to the relay allowance state.

It is assumed that a frame in which the destination corresponds to the ECU connected to the port P2 is received from the port P1, in a case of the setting state as shown in FIG. 6.

In this case, in the switch 3, it is determined that the destination port (that is, the port P2) of the reception frame is set to the relay prohibition state in S430 in FIG. 5. Therefore, the reception frame is not saved and discarded. For example, the reception frame in this case may be temporarily imported to the input portion 13, and may be discarded before the reception frame is transferred from the input portion 13 to the output portion 15.

It is assumed that, in the switch 3, the frame is received from the port P2 set to the relay prohibition state.

In this case, in the switch 3, it is determined that the reception port (that is, the port P2) is set to the relay prohibition state in S410 in FIG. 5. Therefore, the reception frame is not relayed and discarded. The reception frame in this case may be discarded after being imported to the input portion 13, or may be discarded without being imported to the input portion 13.

[4. Effects]

According to the embodiment detailed above, the following effects may be provided.

(4a) When the destination port of the frame received from the port in the relay allowance state is set to the relay prohibition state, the relay process portion 11 discards the reception frame without saving the reception frame in the switch 3. Therefore, the frame received when the destination port is in the relay prohibition state is not transmitted from the destination port of which setting is changed to the relay allowance state after the reception of the frame. According to this switch 3, each of the ports P1 to P3 is set from the relay prohibition state to the relay allowance state at an arbitrary timing, and thereby it may be possible to perform the normal frame relay from the timing. Further, according to this switch 3, it may be possible to prevent an inappropriate flame from being transferred to the destination device, the inappropriate flame being transmitted from the other device before the destination device is in the state where the process regarding the communication is normally executable. As described above, each of the ports P1 to P3 of the switch 3 is set from the relay prohibition state to the relay allowance state, after all the ECUs connected to the ports is in the state where the process regarding the communication is normally executable.

(4b) When receiving the frame from the port set to the relay prohibition state, the relay process portion 11 of the switch 3 immediately discards the reception frame without relaying the reception frame. Therefore, the effect of preventing the transference for the inappropriate frame is high.

(4c) The setting portion 17 of the switch 3 sets all the ports P1 to P3 to the relay prohibition state as the initial state at the activation of the switch 3. Therefore, the switch 3 preferable for configuring an in-vehicle communication system may be implemented.

As a comparative example, in a case of a consumer switch, an unspecified number of devices are connected, and a situation of the communication is not settled. Therefore, a concept of prioritizing the connection is employed. Accordingly, for relaying the frame as much as possible, the switch relays the reception frame immediately after the activation. By contrast, in a case of the in-vehicle communication system, the ECU performing the communication via the switch 3 is settled. In other words, a settled communication partner with the switch 3 corresponds to the ECU. There is a demand that the ports P1 to P3 of the switch 3 are maintained in the relay prohibition state until all the ECUs become in the state where the process regarding the communication is executable. This demand may be satisfied by the switch 3 in the present embodiment.

(4d) The setting portion 17 of the switch 3 determines whether the communication failure occurs for any of the ports P1 to P3, and dynamically sets the port determined to have the communication failure from the relay allowance state to the relay prohibition state. Therefore, even in a case of the frame transmission from the port having the communication failure, the frame transmission to be wasted with a highly possibility is not performed. The reception frame from the port having the communication failure is immediately discarded, and not transferred. That is, it may be possible to prevent the relay for the frame to be abnormal with the high possibility in advance. Accordingly, it may be possible to efficiently improve reliability of a control content executed by the in-vehicle communication system.

[5. Other Embodiments]

While the embodiment of the present disclosure has been described, the present disclosure is not limited to the embodiment described above and can be modified in various manners.

For example, the protocol of the communication system to which the switch 3 is applied may be also a protocol other than Ethernet. Multiple functions of one element in the described above embodiment may be implemented by multiple elements, or one function of one element may be implemented by multiple elements. Further, multiple functions of multiple elements may be implemented by one element, or one function implemented by multiple elements may be implemented by one element. In addition, a part of the configuration of the described above embodiment may be omitted.

In addition to the switch described above, the present disclosure may be implemented in various manners such as a communication system including the switch as a configuration element, a program for causing a computer to function as the switch, a non-transitory tangible storage medium such as a semiconductor memory in which the program is recorded, and a method of relaying the communication data.

The control units and methods described in the present disclosure may be implemented by a special purpose computer created by configuring a memory and a processor programmed to execute one or more particular functions embodied in computer programs. Alternatively, the control units and methods described in the present disclosure may be implemented by a special purpose computer created by configuring a processor provided by one or more special purpose hardware logic circuits. Alternatively, the control units and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the process of the flowchart in the present disclosure includes multiple steps (also referred to as sections), each of which is represented, for instance, as S110. Further, each step can be divided into several sub-steps while several steps can be combined into a single step.

The invention claimed is:

1. A relay apparatus comprising:
a plurality of ports for transmitting and receiving communication data;
a relay process portion configured to execute a relay process of transmitting the communication data received from at least one of the plurality of ports, from a destination port corresponding to the at least one of the plurality of ports connected to a destination device in accordance with a destination for the communication data; and
a setting portion configured to, by an instruction from at least one external device, set each of the plurality of ports to either a relay prohibition state in which relay of the communication data is prohibited or a relay allowance state in which the relay of the communication data is allowed, wherein:
when the destination port for the communication data received from the at least one of the plurality of ports is set to the relay prohibition state, the relay process portion discards the received communication data without saving the received communication data,
each of the plurality of ports is configured to be connected with a plurality of external devices through a corresponding line among a plurality of lines, and
the setting portion is further configured to set each of the plurality ports from the relay prohibition state to the relay allowance state in response to that all of the plurality of external devices connected to the corresponding line is in a state where a process regarding communication is normally executable.

2. The relay apparatus according to claim 1, wherein:
when receiving the communication data from at least one of the plurality of ports set to the relay prohibition state, the relay process portion discards the received communication data without relaying the received communication data.

3. The relay apparatus according to claim 1, wherein:
the setting portion sets all of the plurality of ports to the relay prohibition state as an initial state when the relay apparatus activates.

4. The relay apparatus according to claim 3, wherein the setting portion is further configured to determine that all of the plurality of external devices connected to the corresponding line is in the state where the process regarding communication is normally executable in response to that a preset waiting time has elapsed from a time when the relay apparatus activates.

5. The relay apparatus according to claim 1, wherein:
the setting portion determines whether an uncommunicable failure occurs for each of the plurality of ports, and sets the at least one of the plurality of ports determined to have the uncommunicable failure to the relay prohibition state.

6. The relay apparatus according to claim 5, wherein:
in a case where the setting portion determines that a numeral number of times when an error occurs is equal to or more than a predetermined value, the setting portion determines that the uncommunicable failure occurs.

7. The relay apparatus according to claim 1, wherein:
a settled communication partner with the relay apparatus corresponds to the at least one external device; and
all of the plurality of ports are maintained in the relay prohibition state until the at least one external device becomes in a state where a process regarding the transmission or the reception is executable.

8. A relay apparatus comprising:
a plurality of ports for transmitting and receiving communication data; and
a relay process portion that includes
a processer configured to, by executing a program stored in a computer readable non-transitory storage medium,
execute a relay process of transmitting the communication data received from at least one of the plurality of ports, from a destination port corresponding to the at least one of the plurality of ports connected to a destination device in accordance with a destination for the communication data, and,
by an instruction from at least one electronic control unit, set each of the plurality of ports to either a relay prohibition state in which relay of the communication data is prohibited or a relay allowance state in which the relay of the communication data is allowed, wherein:
when the destination port for the communication data received from the at least one of the plurality of ports is set to the relay prohibition state, the processer discards the received communication data without saving the received communication data,
each of the plurality of ports is configured to be connected with a plurality of external devices through a corresponding line among a plurality of lines, and
the processer is further configured to, by executing the program stored in the computer readable non-transitory storage medium, set each of the plurality ports from the relay prohibition state to the relay allowance state in response to that all of the plurality of external devices connected to the corresponding line is in a state where a process regarding communication is normally executable.

9. The relay apparatus according to claim 1, wherein:
when the destination port for the communication data received from the at least one of the plurality of ports is set to the relay prohibition state, transfer and output of the received communication data from the destination port are prohibited.

10. The relay apparatus according to claim 8, wherein:
when the destination port for the communication data received from the at least one of the plurality of ports is set to the relay prohibition state, transfer and output of the received communication data from the destination port are prohibited.

11. The relay apparatus according to claim 8, wherein
the processer is further configured to, by executing the program stored in the computer readable non-transitory storage medium,
set all of the plurality of ports to the relay prohibition state as an initial state when the relay apparatus activates, and
determine that all of the plurality of external devices connected to the corresponding line is in the state where the process regarding communication is normally executable in response to that a preset waiting time has elapsed from a time when the relay apparatus activates.

* * * * *